United States Patent
Comer et al.

(10) Patent No.: US 11,210,682 B2
(45) Date of Patent: Dec. 28, 2021

(54) METHOD OF CORRELATING BID PRICE TO INTRINSIC VALUE IN A SURVEY PLATFORM

(71) Applicant: Lucid Holdings, LLC, New Orleans, LA (US)

(72) Inventors: Patrick B. Comer, Luling, LA (US); Karunakaran Sureshkumar, Los Angeles, CA (US); Alex Leger, New Orleans, LA (US); Vignesh Krishnan, New Orleans, LA (US)

(73) Assignee: Lucid Holdings, LLC, New Orleans, LA (US)

( * ) Notice: Subject to any disclaimer, the term of this patent is extended or adjusted under 35 U.S.C. 154(b) by 0 days.

(21) Appl. No.: 16/881,861

(22) Filed: May 22, 2020

(65) Prior Publication Data

US 2020/0357008 A1 Nov. 12, 2020

Related U.S. Application Data

(63) Continuation of application No. 15/804,491, filed on Nov. 6, 2017, now Pat. No. 10,692,100, which is a continuation of application No. 14/251,434, filed on Apr. 11, 2014, now Pat. No. 9,824,369.

(60) Provisional application No. 61/810,791, filed on Apr. 11, 2013.

(51) Int. Cl.
*G06Q 30/02* (2012.01)

(52) U.S. Cl.
CPC ..... *G06Q 30/0201* (2013.01); *G06Q 30/0203* (2013.01)

(58) Field of Classification Search
None
See application file for complete search history.

(56) References Cited

U.S. PATENT DOCUMENTS

| | | |
|---|---|---|
| 6,999,987 B1 | 2/2006 | Billingsley et al. |
| 7,158,988 B1 | 1/2007 | Kirkpatrick et al. |
| 7,539,696 B1 | 5/2009 | Greener et al. |
| 9,824,369 B1 | 11/2017 | Comer et al. |
| 10,692,100 B2 | 6/2020 | Comer et al. |
| 2002/0128898 A1* | 9/2002 | Smith, Jr. .......... G06Q 30/0203 705/7.32 |
| 2002/0152092 A1 | 10/2002 | Bibas et al. |
| 2002/0188777 A1 | 12/2002 | Kraft et al. |
| 2003/0204436 A1 | 10/2003 | Flender et al. |
| 2005/0075919 A1 | 4/2005 | Kim |

(Continued)

OTHER PUBLICATIONS

"U.S. Appl. No. 14/251,434, Final Office Action dated Nov. 7, 2016", 20 pgs.

(Continued)

*Primary Examiner* — Sujay Koneru
(74) *Attorney, Agent, or Firm* — Schwegman Lundberg & Woessner, P.A.

(57) ABSTRACT

An online survey platform and process for correlating the bid price offered by a supplier for the completion of an out-of-network survey hosted on the survey platform to one or more intrinsic value indicators of the survey. If the supplier's bid price is less than or equal to the survey budget price set by the buyer, then the routing platform of the present invention will route the supplier's respondent(s) to the survey.

20 Claims, 9 Drawing Sheets

(56) References Cited

U.S. PATENT DOCUMENTS

| | | | |
|---|---|---|---|
| 2005/0202390 A1* | 9/2005 | Allen | G09B 7/00 434/353 |
| 2007/0174108 A1* | 7/2007 | Monster | G06Q 30/0205 705/7.32 |
| 2007/0192166 A1 | 8/2007 | Van Luchene | |
| 2008/0010351 A1 | 1/2008 | Wardhaugh et al. | |
| 2008/0065565 A1 | 3/2008 | Walker et al. | |
| 2008/0109278 A1 | 5/2008 | Rao | |
| 2008/0243586 A1* | 10/2008 | Dohring | G06Q 30/02 705/7.32 |
| 2009/0228340 A1* | 9/2009 | Bohannon | G06Q 30/0217 705/14.53 |
| 2009/0248603 A1* | 10/2009 | Kiersky | G06N 20/00 706/47 |
| 2010/0023380 A1 | 1/2010 | Anderson | |
| 2010/0043080 A1 | 2/2010 | Overpeck | |
| 2010/0205037 A1* | 8/2010 | Besehanic | G06Q 30/0205 705/7.34 |
| 2010/0280906 A1 | 11/2010 | Lim et al. | |
| 2010/0324971 A1* | 12/2010 | Morsberger | G06Q 30/0245 705/7.32 |
| 2011/0145043 A1 | 6/2011 | Handel | |
| 2011/0231483 A1 | 9/2011 | Derraugh et al. | |
| 2012/0116845 A1* | 5/2012 | Warta | G06Q 30/0203 705/7.32 |
| 2012/0130934 A1 | 5/2012 | Brillhart et al. | |
| 2012/0158478 A1 | 6/2012 | Holder | |
| 2012/0173305 A1 | 7/2012 | Bhaskaran | |
| 2012/0221418 A1 | 8/2012 | Smith | |
| 2012/0226743 A1* | 9/2012 | Smargon | G06Q 20/06 709/203 |
| 2012/0271884 A1* | 10/2012 | Holmes | G06Q 30/02 709/204 |
| 2012/0316921 A1* | 12/2012 | Carsanaro | G06F 3/04842 705/7.32 |
| 2013/0007865 A1* | 1/2013 | Krishnamurthy | H04L 63/08 726/7 |
| 2013/0111323 A1 | 5/2013 | Taghaddos et al. | |
| 2013/0132328 A1* | 5/2013 | Alush | G06Q 30/0203 706/52 |
| 2013/0159071 A1* | 6/2013 | Inks | G06Q 30/0601 705/14.1 |
| 2013/0204694 A1* | 8/2013 | Banister | G06Q 30/0255 705/14.41 |
| 2013/0246302 A1 | 9/2013 | Black | |
| 2014/0087688 A1* | 3/2014 | Chiu | H04M 15/43 455/406 |
| 2014/0089049 A1* | 3/2014 | Cristofaro | H04W 12/02 705/7.32 |
| 2014/0156349 A1* | 6/2014 | McLoughlin | G06Q 30/0203 705/7.32 |
| 2018/0121937 A1 | 5/2018 | Comer et al. | |

OTHER PUBLICATIONS

"U.S. Appl. No. 14/251,434, Non Final Office Action dated Apr. 19, 2016", 17 pgs.

"U.S. Appl. No. 14/251,434, Notice of Allowance dated Jul. 21, 2017", 17 pgs.

"U.S. Appl. No. 14/251,434, Response filed Oct. 18, 2016 to Non Final Office Action dated Apr. 19, 2016", 14 pgs.

"U.S. Appl. No. 14/251,434, Response filed May 8, 2017 to Final Office Action dated Nov. 7, 2016", 23 pgs.

"U.S. Appl. No. 15/804,491, Examiner Interview Summary dated Jan. 13, 2020", 3 pgs.

"U.S. Appl. No. 15/804,491, Non Final Office Action dated Oct. 10, 2019", 9 pgs.

"U.S. Appl. No. 15/804,491, Notice of Allowance dated Feb. 3, 2020", 9 pgs.

"U.S. Appl. No. 15/804,491, Response filed Jan. 10, 2020 to Non Final Office Action dated Oct. 10, 2019", 13 pgs.

"U.S. Appl. No. 15/804,491, Supplemental Preliminary Amendment filed Jan. 22, 2018", 11 pgs.

"U.S. Appl. No. 15/804,491. Preliminary Amendment filed Nov. 6, 2017", 3 pgs.

* cited by examiner

METHOD OF CORRELATING BID PRICE TO INTRINSIC VALUE IN A SURVEY PLATFORM

CROSS-REFERENCE TO RELATED APPLICATION

This application is a continuation of U.S. patent application Ser. No. 15/804,491, filed Nov. 6, 2017, which application is a continuation of U.S. patent application Ser. No. 14/251,434, filed Apr. 11, 2014, which application claims the benefit of U.S. Provisional Application No. 61/810,791, filed Apr. 11, 2013, which applications are hereby incorporated by reference in their entirety.

BACKGROUND

Traditionally, market research firms needing surveys obtain price bids from suppliers of survey panels. Survey panels are a collection of potential survey participants (i.e., "respondents") available to complete online surveys. The supplier may quote a price per completed survey, e.g., $15 per complete. A survey requiring 5,000 completed surveys would therefore cost $75,000. The nature of each survey may be taken into consideration in determining the price a supplier charges a market research firm (or other survey buyer) to conduct a survey. For example, it is implicitly difficult to find survey respondents who own a Ferrari than survey respondents who own a Honda. Therefore, a supplier would charge a higher price for a survey requiring the survey respondents to be Ferrari owners than for a survey requiring the survey respondents to be Honda owners.

Online surveys may include demographic questions designed to determine whether the respondent meets predefined demographic criteria (e.g., age, gender, ethnicity, and/or income), targeted questions designed to determine whether the respondent meets predefined familiarity and/or utilization criteria for a certain product or service category (e.g., respondents who use a particular product, such as a beverage, at least three times per week), and substantive questions designed to gather objective data points for statistical and other analysis. Only respondents who meet the predefined criteria for the demographic questions and the targeted questions are prompted to respond to the substantive questions of the online survey. Respondents who do not meet the predefined criteria for any demographic or targeted question are terminated from that particular online survey (i.e., do not qualify for the survey). Also, a respondent may not qualify for an online survey because the respondent enters information indicating that he/she is in a category that is full. For example, surveys may seek a predefined mixture of respondents, such as 50% male and 50% female, and a predefined total number of 200 respondents. In this example, if 100 females have already responded to the survey, the next female respondent will not qualify for the survey.

Incidence and conversion are two measurements of the intrinsic value of a particular survey. In other words, these measurements provide a basis for a supplier to set a price for a particular survey. Incidence is the percentage of the number of completed surveys divided by the number of respondents passing all demographic questions. A higher incidence value indicates a lower value of the survey (i.e., it is easier to find respondents for the survey and the survey price is lower). Conversion is the percentage of the number of completed surveys divided by the number of respondents passing all demographic and targeted questions. Similarly, a higher conversion value indicates a lower value of the survey. Because there is no standard definition of incidence or conversion, these measurements may be defined differently by different individuals. Nevertheless, a higher conversion or incidence value indicates a lower value of the survey.

Another indication of the intrinsic value of a particular survey is the length of interview (LOI). The longer it takes a respondent to complete a survey (i.e., longer LOI), the more difficult it is to find respondents. For two surveys with the same incidence rates, a survey with a higher LOI will be more expensive than a survey with a lower LOI.

Because multiple suppliers oftentimes must be engaged to meet the demographic requirements of a survey, intermediate companies called routers may be utilized to automate aspects of managing the multiple suppliers. Routers utilize software to route respondents to an inventory of surveys. The router module of the survey management system has a two-fold responsibility. First, it is responsible for routing the respondents to appropriate surveys. Second, the router must view the survey pool holistically and affirm that the surveys collectively have a high chance of completion. For the latter responsibility, the router has to employ a combination of the contradictory aspects of randomization and prioritization to disperse respondents efficiently. Intelligent dispersion of respondents is one of the core features of a router. Thus, when a respondent fails to meet demographic criteria or familiarity/use criteria for a given online survey, the router matches the respondent's information against other online surveys in the pool and prompts the respondent with more questions to determine whether the respondent meets the demographic and familiarity/use criteria for a second online survey. If the respondent qualifies, he/she is prompted to respond to the substantive questions of the second online survey. Otherwise, the router continues to prompt the respondent with more questions for different online surveys in the pool.

FIG. 1 illustrates a conventional router platform capable of hosting a plurality of surveys on behalf of a plurality of buyers (e.g., market research companies). The surveys can be accessed by a supplier's panel of respondents. In the example depicted in FIG. 1, the router platform is hosting Surveys S1, S2, S3, S4, and S5 for Buyers B1, B2, B3, B4, and B5, respectively. The router platform is also hosting Surveys S6, S7, S8, and S9 for Buyers B6, B7, B8, and B9, respectively. The supplier of Panel A has agreed with each of the Buyers B1-B5 to a survey price (e.g., $15/completed survey) for each of the Surveys S1-S5. The supplier of Panel B has agreed with each of the Buyers B6-B9 to a survey price (e.g., $20/completed survey) for each of Surveys S6-S9. Each price may be determined by one or more intrinsic value indicators of an online survey, such as incidence, conversion, and/or length of interview.

FIG. 2 illustrates a representative routing process within a conventional router platform. With reference to FIG. 2, Respondent R1 of Panel A may be sent to the router platform for Survey S3. If Respondent R1 fails to qualify for Survey S3, the router platform will send Respondent R1 to another online survey on the router platform. For example, the router platform may send Respondent R1 to Survey S8 despite the fact that the supplier of Panel A and Buyer B8 have not negotiated a price per completed survey for Survey S8. In such situations, Respondent R1 is considered a "routed respondent" in Survey S8.

Traditionally, a router platform uses a standard rate or price per completed survey for routed respondents from each panel. For example, the supplier of Panel A could have set a price of $10 per online survey completed by one of its respondents who were routed to an out-of-network survey (i.e., a survey for which the supplier has not negotiated a survey price with the buyer) on the router platform. Also, each buyer traditionally sets a budget or cap for each online survey completed by a respondent routed to its survey from an out-of-network panel. For example, Buyer B8 could have set a budget of $17 per online survey completed by a respondent other than Panel B respondents. A panel's routed pricing is usually lower than its pricing for in-network surveys (i.e., surveys for which the supplier has negotiated a survey price with the buyer) since the respondent is yielding revenue when otherwise none would be due since the respondent was terminated from the in-network survey. Suppliers and buyers typically will not have access to each other's pricing for routed respondents.

In the foregoing example, Panel A would be paid $10 (its routed price per complete) for Respondent R1's completed Survey S8. The fact that Buyer B8 set a budget of $17 per routed complete for Survey S8 suggests that Panel A was underpaid for Respondent R1's completed Survey S8. While the supplier of Panel A could set a higher price for each routed complete, such as $25, this higher rate may prevent Panel A's respondents from being routed to other surveys on the router platform since the buyers have the ability of setting caps or budgets for routed completes of its surveys. For example, if Panel A's routed price per complete was $25, Respondent R1 would not have been routed to Survey S8 because Panel A's price per routed complete would be higher than Buyer B8's budget of $17 per routed complete for Survey S8. Without access to the intrinsic value indicators of the out-of-network surveys, the supplier has little to no data on which to base its bid price for the completion of out-of-network surveys. As a result, suppliers inevitably lose revenue due to its routed pricing not being based on the value of the surveys to which its respondents are routed.

SUMMARY OF THE INVENTION

The invention disclosed herein is directed to an online survey platform and process for correlating the bid price offered by a supplier for the completion of an out-of-network survey hosted on the survey platform to one or more intrinsic value indicators of the survey. If the supplier's bid price is less than or equal to the survey budget price set by the buyer, then the routing platform of the present invention will route the supplier's respondent(s) to the survey.

In one embodiment of the process of the present invention, a router platform will populate a list of matched online surveys from the pool of surveys hosted on the platform. The router platform then will route the respondent to an online survey selected from the populated list. Next, the router platform will present screening questions (demographic and/or targeted questions) to the respondent to determine if he/she qualifies for the survey. If the respondent qualifies, the routing platform will utilize the supplier's routed pricing grid data and one or more intrinsic value indicators (e.g., LOI, survey conversion value, survey incidence value, etc) of the survey to calculate the supplier's bid price. If the supplier's bid price for the particular survey is less than the buyer's budget, the router platform will send the respondent to the substantive portion of the survey.

The above summary is not intended to describe each illustrated embodiment or every possible implementation. These and other features, aspects, and advantages of the present invention will become better understood with regard to the following description, appended claims, and accompanying drawings.

BRIEF DESCRIPTION OF THE DRAWINGS

The accompanying figures, where like reference numerals refer to identical or functionally similar elements throughout the separate views, and which, together with the detailed description below, are incorporated in and form part of the specification, serve to illustrate further various embodiments and to explain various principles and advantages in accordance with the present invention.

DETAILED DESCRIPTION

Figure 1:
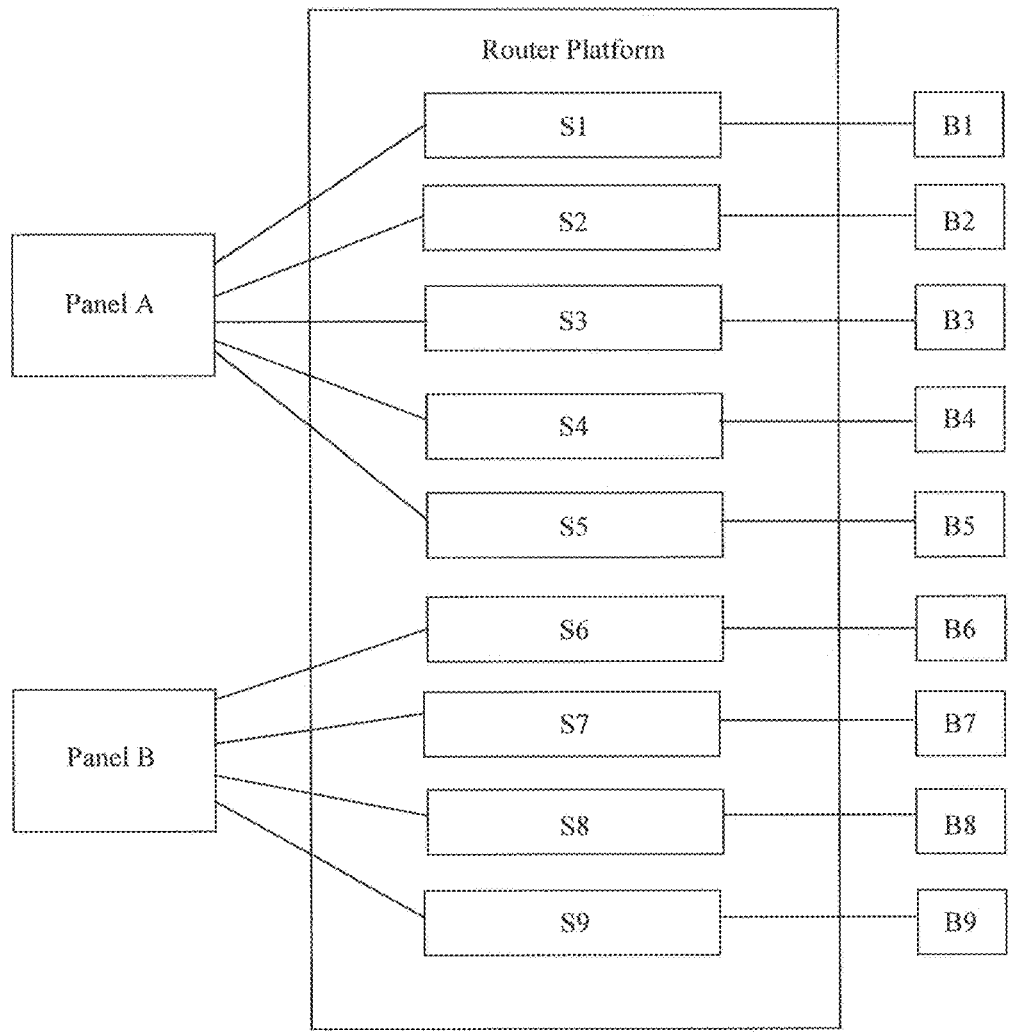
FIG. 1 is a schematic illustration of an exemplary router platform.
Figure 2:
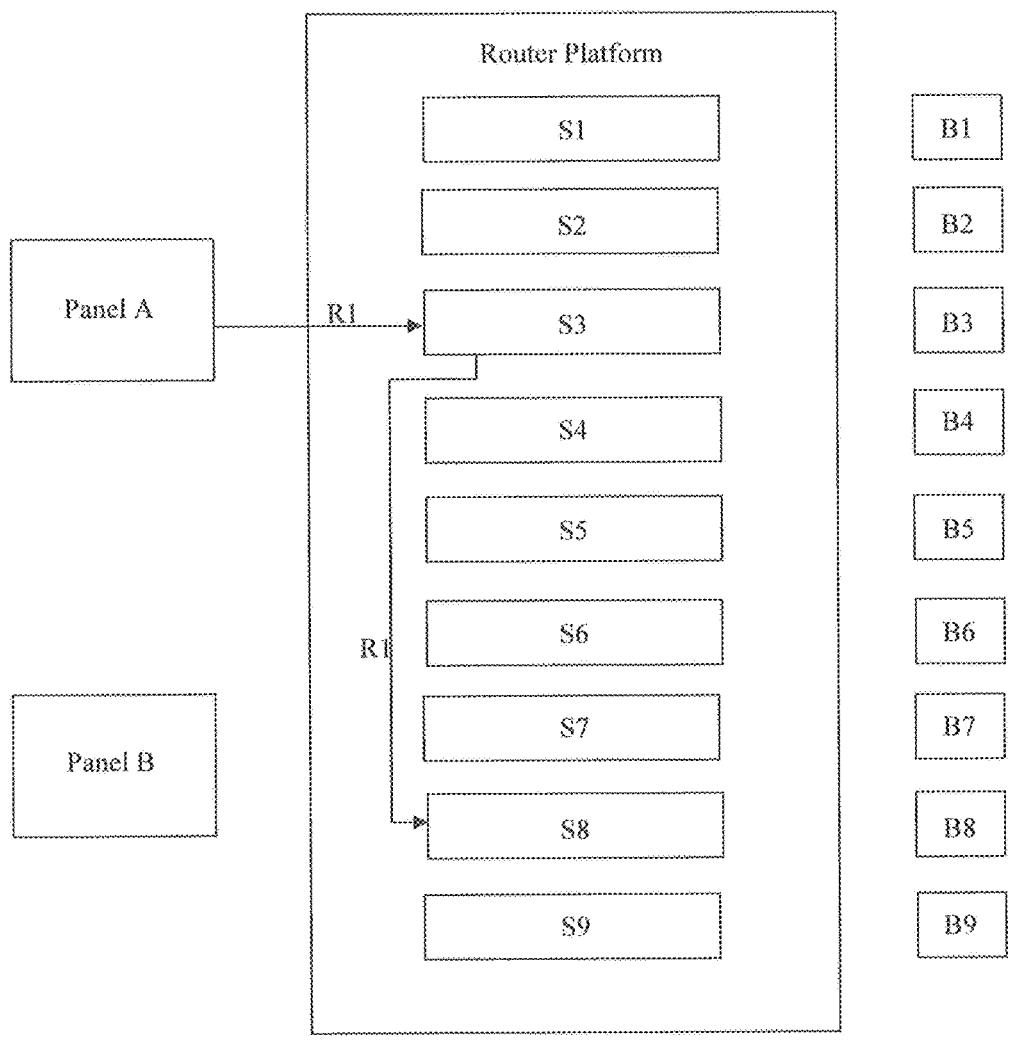
FIG. 2 is a schematic illustration of the routing functionality exhibited by the router platform of FIG. 1.

Detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed environment. Alternate embodiments may be devised without departing from the spirit or the scope of the invention. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward.

As used herein, the terms "a" or "an" are defined as one or more than one. The term "plurality," as used herein, is defined as two or more than two. The term "another," as used herein, is defined as at least a second or more. The terms "comprises," "comprising," or any other variation thereof are intended to cover a non-exclusive inclusion, such that a process, method, article, or apparatus that comprises a list of elements does not include only those elements, but may include other elements not expressly listed or inherent to such process, method, article, or apparatus. An element proceeded by "comprises . . . a" does not, without more constraints, preclude the existence of additional identical elements in the process, method, article, or apparatus that comprises the element. The terms "including," "having," or "featuring," as used herein, are defined as comprising (i.e., open language).

The terms "router platform," "routing platform," and "survey platform" may be used interchangeably herein and refer to a storage device, software program, processor, and any other components necessary to host one or more surveys accessible by respondents via a communications network such as a local area network (LAN), a wide area network (WAN), a wireless network, an intranet, the internet, or other communications means.

The present invention is a router platform and process for dynamically matching the bid price offered by a supplier for the completion of a survey hosted on the survey platform to the intrinsic value of the survey. If the supplier's bid price is less than or equal to the survey budget price set by the buyer, then the routing platform of the present invention will route the supplier's respondent(s) to the survey.

A router platform embodying principles of the present invention features a plurality of online surveys hosted on the platform. In certain embodiments, the entire survey (i.e., both screening questions and substantive survey questions) can be hosted on the router platform. In other embodiments, only the screening questions (both demographic and targeted questions) will be hosted on the router platform. If the respondent qualifies for the survey, he/she may be directed to a third party website (e.g., a website managed by the buyer or the survey creator/administrator) which is hosting the substantive questions of the survey.

Figure 3:
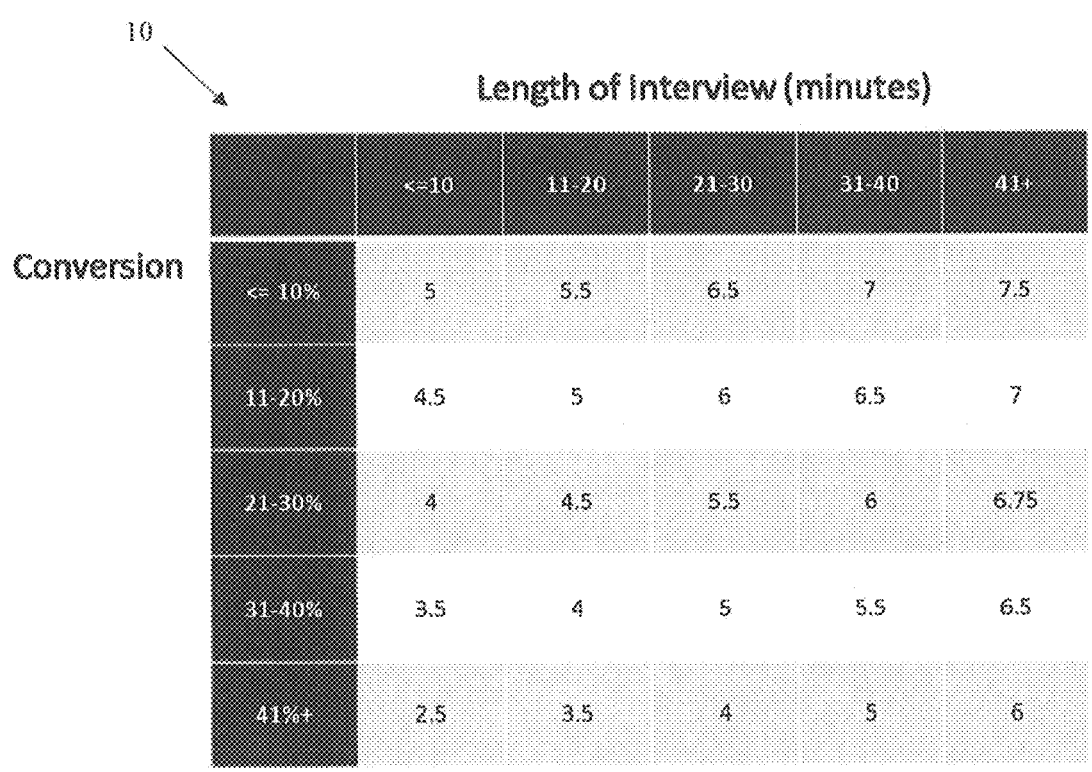
FIG. 3 is a schematic illustration of an embodiment of a routed pricing grid exemplifying principles of the present invention.

Referring to FIG. 3, an embodiment of a routed pricing grid is depicted. The routed pricing grid 10 may provide a price charged by a supplier's panel for surveys completed by its respondents who are routed to another buyer's surveys ("routed completes"). The routed pricing grid may provide differing prices for routed completes based upon an intrinsic value indicator of a survey. The routed pricing grid may provide differing prices for routed completes based upon the conversion percentage for a survey. Alternatively, the routed pricing grid may provide differing prices for routed completes based upon the incidence percentage or LOI for a survey.

In one embodiment, the routed pricing grid may provide differing prices for routed completes based upon two or more intrinsic value indicators of a survey. For example, grid 10 in FIG. 3 includes prices for routed completes based upon a survey's LOI and conversion percentage. Grid 10 may include a 25-point grid, which may allow a supplier to set a price for routed completes on surveys whose LOI values fall within five ranges and whose conversion percentages fall within five ranges. The LOI ranges may be 10 minutes or less, 11-20 minutes, 21-30 minutes, 31-40 minutes, and 41 minutes or more. The conversion percentage ranges may be 10% or less, 11-20%, 21-30%, 31-40%, and 41% or more. Grid 10 may include a price for a routed complete of a survey falling into any combination of LOI range and conversion percentage range. Grid 10 may include any number of ranges for LOI and conversion percentage. The highest price per routed complete may be for a survey whose LOI value falls within the highest LOI range of grid 10 and whose conversion percentage falls within the lowest conversion percentage range of grid 10. For example, Grid 10 may include a price of $7.5 per routed complete for a survey with an LOI value of 41 minutes or more and a conversion percentage of 10% or less. Conversely, the lowest price per routed complete may be for a survey whose LOI value falls within the lowest LOI range of the grid 10 and whose conversion percentage falls within the highest conversion percentage range of grid 10. For example, Grid 10 may include a price of $2.50 per routed complete for a survey with an LOI value of 10 minutes or less and a conversion percentage of 41% or less.

Figure 4:
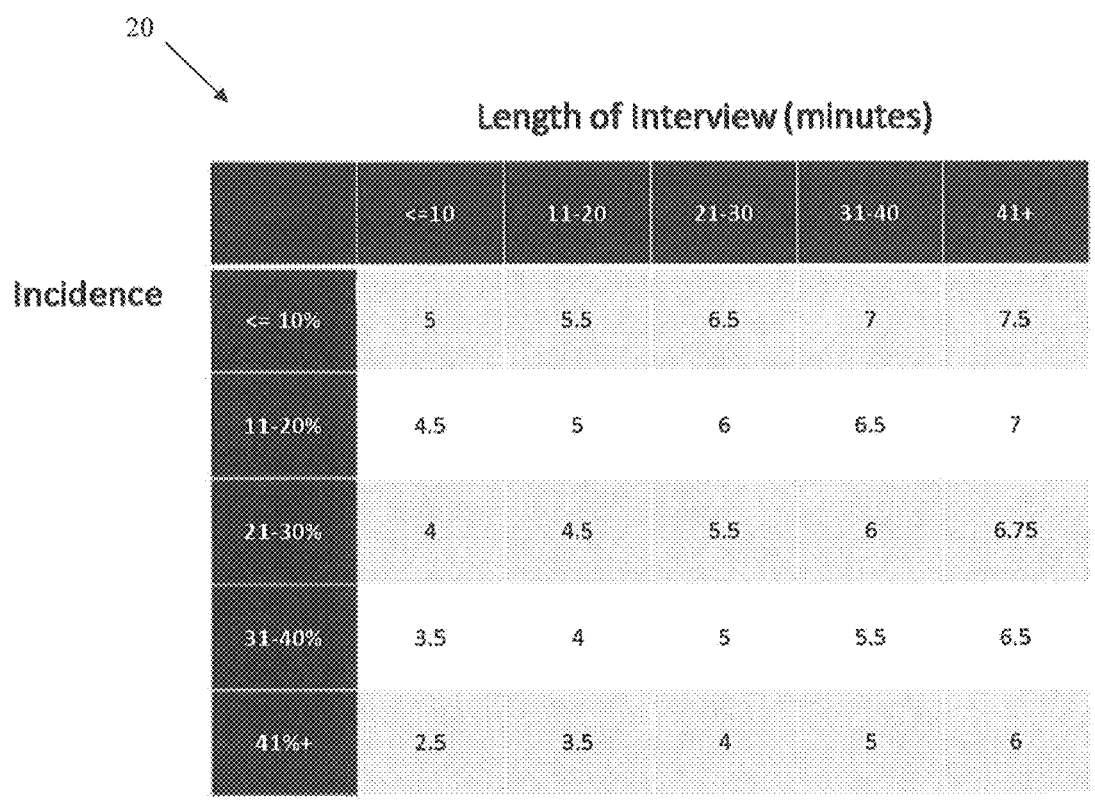
FIG. 4 is a schematic illustration of an alternative embodiment of a routed pricing grid exemplifying principles of the present invention.

Alternatively, grid 20 shown in FIG. 4 includes prices for routed completes based upon a survey's LOI and incidence percentage. Grid 20 may provide a price for a routed complete of a survey falling into any combination of LOI range and incidence percentage range. Grid 20 may include any number of ranges for LOI and incidence percentage. The highest price per routed complete may be for a survey whose LOI value falls within the highest LOI range of grid 20 and whose incidence percentage falls within the lowest incidence percentage range of grid 20. For example, Grid 20 may include a price of $7.5 per routed complete for a survey with an LOI value of 41 minutes or more and an incidence percentage of 10% or less. Conversely, the lowest price per routed complete may be for a survey whose LOI value falls within the lowest LOI range of the grid 20 and whose incidence percentage falls within the highest incidence percentage range of grid 20. For example, Grid 20 may include a price of $2.50 per routed complete for a survey with an LOI value of 10 minutes or less and an incidence percentage of 41% or less.

In another alternative embodiment, the routed pricing grid may provide prices for routed completes based upon LOI, incidence percentage, and conversion percentage.

Suppliers of survey panels may set a routed pricing grid on the router platform. Buyers may also set a budget for routed completes of each of their surveys. The LOI value, conversion percentage, and/or incidence percentage for each survey may initially be an estimated value provided by the buyer or the survey creator/administrator.

The router platform may route a respondent who is terminated from a first online survey on the router platform to a second online survey on the router platform. In selecting the second online survey from the plurality of online surveys, the router platform may determine which of the plurality of online surveys has a budget set by its survey buyer that is greater than the survey's price on the panel's routed pricing grid based upon the initial estimated values of the LOI value, conversion percentage, and/or incidence percentage of the survey. The router platform may perform this comparison for each of the plurality of online surveys on the router platform (other than the first online survey) to obtain a group of price-matched online surveys, and then select the second online survey from the group of price-matched online surveys randomly or on some predefined basis (e.g., by selecting the online survey having the highest price on the respondent's routed pricing grid). Alternatively, the router platform may perform this comparison for a single online survey on the router platform at a time, and may route the respondent to the first online survey for which the buyer's predefined budget is greater than the online survey's price on the respondent's panel's routed pricing grid.

The price matching method may further include measuring and recording the criteria necessary to calculate each of the value indicators for each online survey as each respondent takes and completes each online survey on the router platform. The criteria may include a start time, an end time, a count of respondents who begin an online survey, a count of respondents who are terminated in the demographic questions of the online survey, a count of respondents who are terminated in the targeted questions of the online survey, a count of respondents who begin substantive questions of an online survey, a count of respondents who are terminated in the substantive questions of the online survey, and/or a count of respondents who complete the online survey. From this information, the value indicators for each online survey may be updated from the initial estimated values to actual measured values as respondents take and complete the online survey.

For example, from Respondent 1's start time and end time on Survey 1, the router platform can calculate the LOI for Respondent 1 on Survey 1. The router platform may also calculate the LOI for Respondents 2-200 on Survey 1. The actual measured LOI value for survey 1 may be a median or mean value of Respondents 1-200's LOI values on Survey 1. The router platform may recalculate the median LOI value for Survey 1 each time a respondent completes Survey 1. In this example, when Respondent 201 completes Survey 1, the router platform will calculate Respondent 201's LOI for Survey 1 from his/her start time and end time. The router platform may then update the median LOI value for Survey 1 with Respondent 201's LOI for Survey 1.

The router platform may perform the same calculations to obtain real time median values for the conversion percentage and incidence percentage for each online survey. The router platform may use the count of respondents who begin the substantive questions for an online survey and the count of respondents who complete the online survey to calculate the conversion percentage. Alternatively, the router platform may use the count of respondents who are terminated in the substantive questions of the online survey and the count of respondents who complete the online survey to calculate the conversion percentage. For example, if 120 respondents began the substantive questions for Survey 1 and 30 respondents completed Survey 1, the router platform will calculate the conversion percentage for Survey 1 of 25% (30/120). If another respondent then begins the substantive questions for Survey 1, but does not complete Survey 1, the router platform will automatically update the conversion percentage for Survey 1 to 24.8% (30/121).

The router platform may use the count of respondents who completed the demographic questions of an online survey and the count of respondents who completed the online survey to calculate the incidence percentage for the online survey. Alternatively, the router platform may use the count of respondents who begin the online survey, the count of respondents who are terminated in the demographic questions of the online survey, and the count of respondents who complete the online survey to calculate the incidence percentage for the online survey. For example, if 300 respondents completed the demographic questions of Survey 2 without being terminated and 45 respondents completed Survey 2, the router platform will calculate the incidence percentage for Survey 2 of 15% (45/300). If another respondent then completes the demographic questions of Survey 2 and completes Survey 2, the router platform will automatically update the incidence percentage for Survey 2 of 15.3% (46/301).

The router platform may use the real time measurements of the intrinsic value indicators to price match a respondent who is terminated from a first online survey on the router platform with a second online survey. The router platform may simply use the intrinsic value indicator measurements instead of the initial estimated intrinsic value indicator in the example provided above by using the price on the panel's routed pricing grid for the intrinsic value indicator measurement of each online survey.

For each respondent terminated from an online survey on the router platform, the router platform may review the budgets of all online surveys to which the respondent may be routed. The price for each of these potential online surveys may be determined from the routed pricing grid for the respondent's panel, such as grid 10 in FIG. 3, using the real time value for conversion and LOI for each of the potential online surveys. Alternatively, the real time value for incidence and LOI for each of the potential online surveys may be used to determine the price for each of these online surveys from the routed pricing grid for the respondent's panel, such as grid 20 in FIG. 4. In either case, if the price indicated in the routed pricing grid for a given survey is less than the budget set by the survey buyer for routed completes for the survey, this survey is an valid routing destination for the respondent.

The router platform may also allow a supplier to set a default routed pricing grid for its panel of respondents and one or more exception routed pricing grids for certain routing circumstances. For example, a supplier may set an exception routed pricing grid for its respondents in a particular market, such as geographic locations (e.g., India). Alternatively, a supplier may set an exception routed pricing grid for online surveys of particular survey buyers with whom the supplier may have predefined pricing agreements. For example, Surveys 20, 21, and 22 may be associated with Panel Z and Buyer 7. Panel X may have a predefined pricing agreement with Buyer 7 in which Panel X agrees to give a discounted price to Buyer 7 for Panel X's respondents who are routed to Buyer 7's surveys, including Surveys 20, 21, and 22. In this example, Panel X could set both a default routed pricing grid for its respondents who are routed to all online surveys other than those associated with Panel X and an exception routed pricing grid for its respondents who are routed to all online surveys associated with Buyer 7 (i.e., for Surveys 20, 21, and 22).

In certain embodiments, suppliers can provide routed pricing values on demand through an API. Rather than set a routed pricing grid on the router platform, each supplier will have the flexibility to provide pricing values based on custom conversion/incidence percentages and LOI ranges as defined in their native systems. Each supplier will be able to receive such value indicators as conversion percentage, incidence percentage, LOI, buyer, and country/market from the router platform and return routed pricing values on an automated basis through the API.

Figure 5:
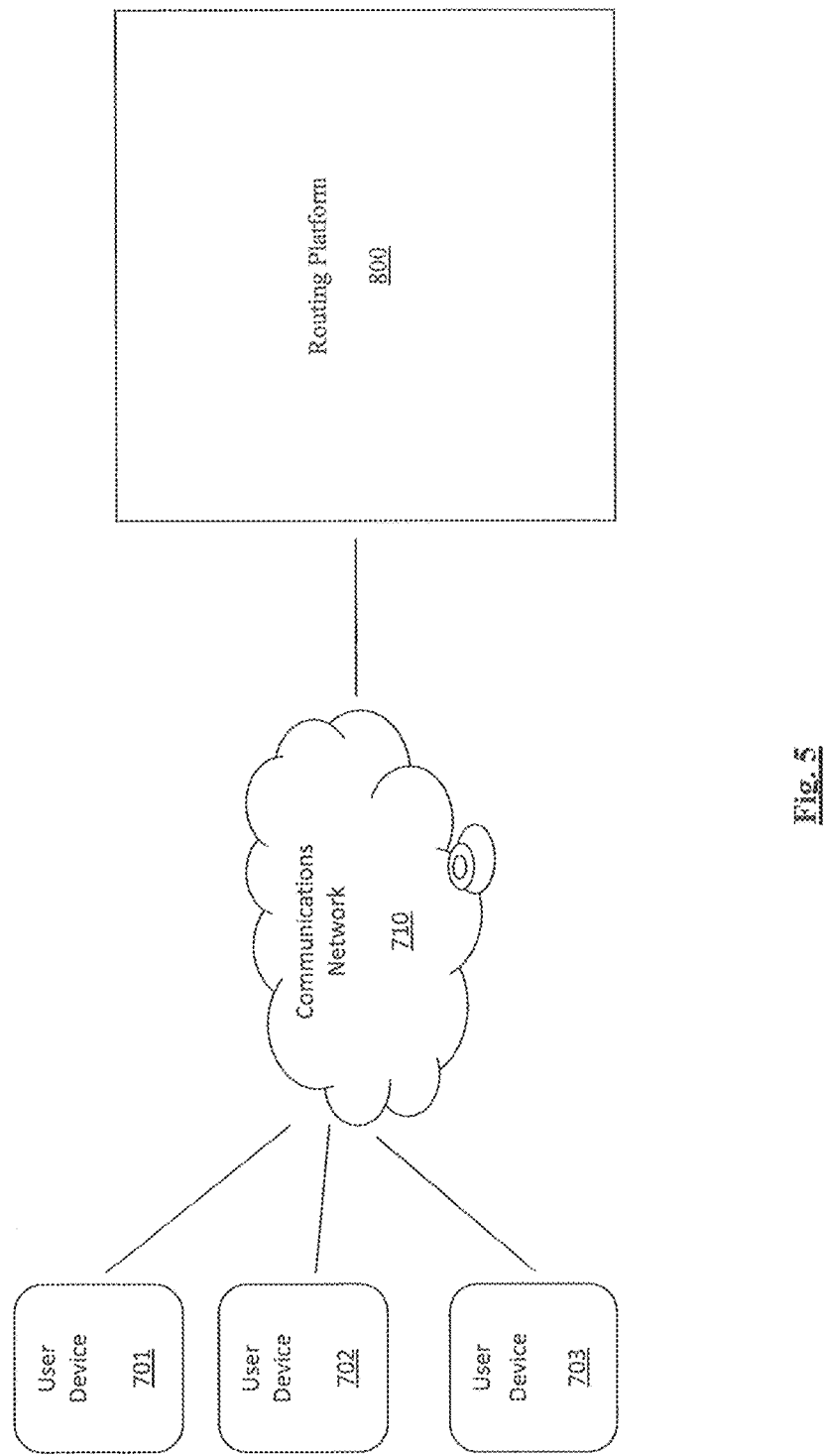
FIG. 5 is a block diagram illustrating the environment in which an embodiment of the router platform of the present invention operates.

Referring now to FIG. 5, an exemplary environment in which the router platform of the present invention operates is illustrated. One or more clients (respondents, suppliers, or buyers) may access the router platform 800 using their user devices 701, 702, 703 via a communications network 710. In various embodiments, user devices 701, 702, 703 include a desktop computer, a laptop computer, or a mobile device such as a tablet or smartphone. In various embodiments, the communications network 710 includes a local area network (LAN), a wide area network (WAN), a wireless network, an intranet, the internet, and so forth.

Figure 6:
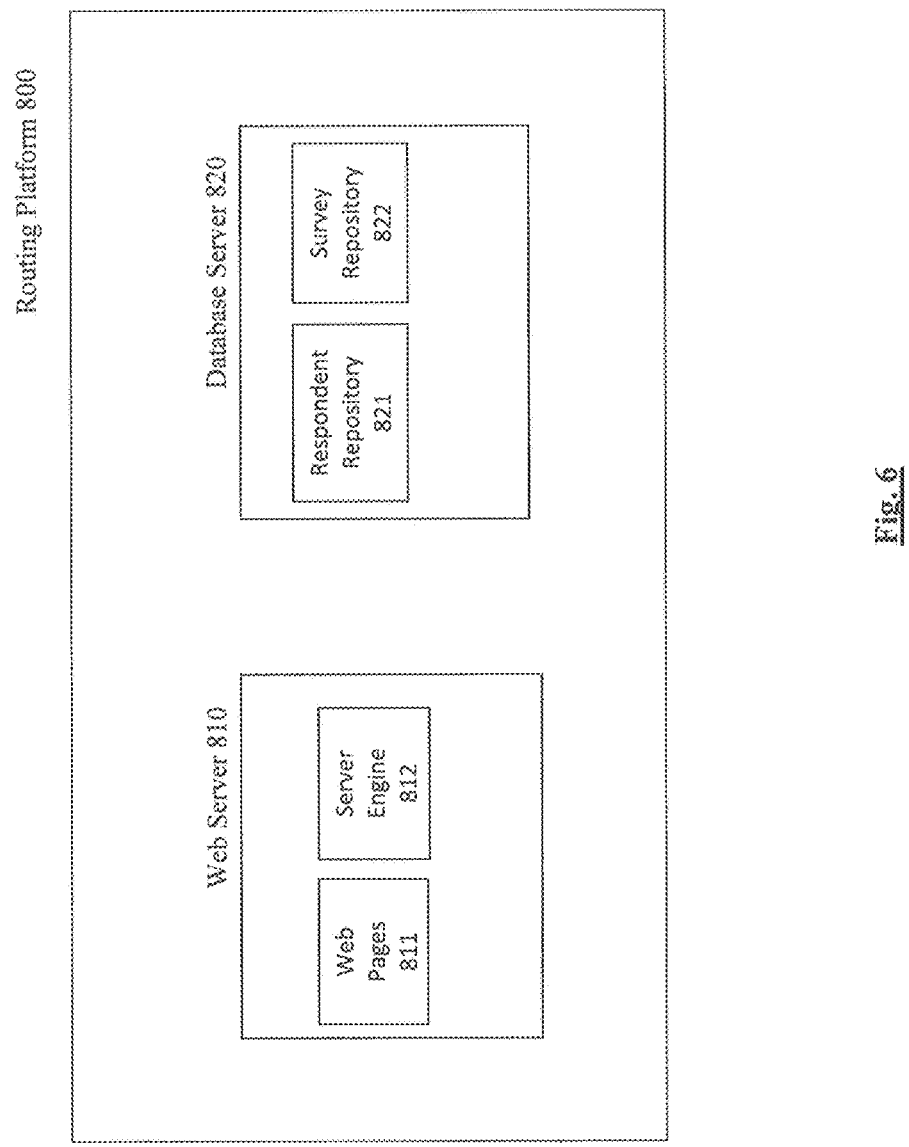
FIG. 6 is a block diagram depicting an embodiment of the router platform of the present invention.
Figure 7:
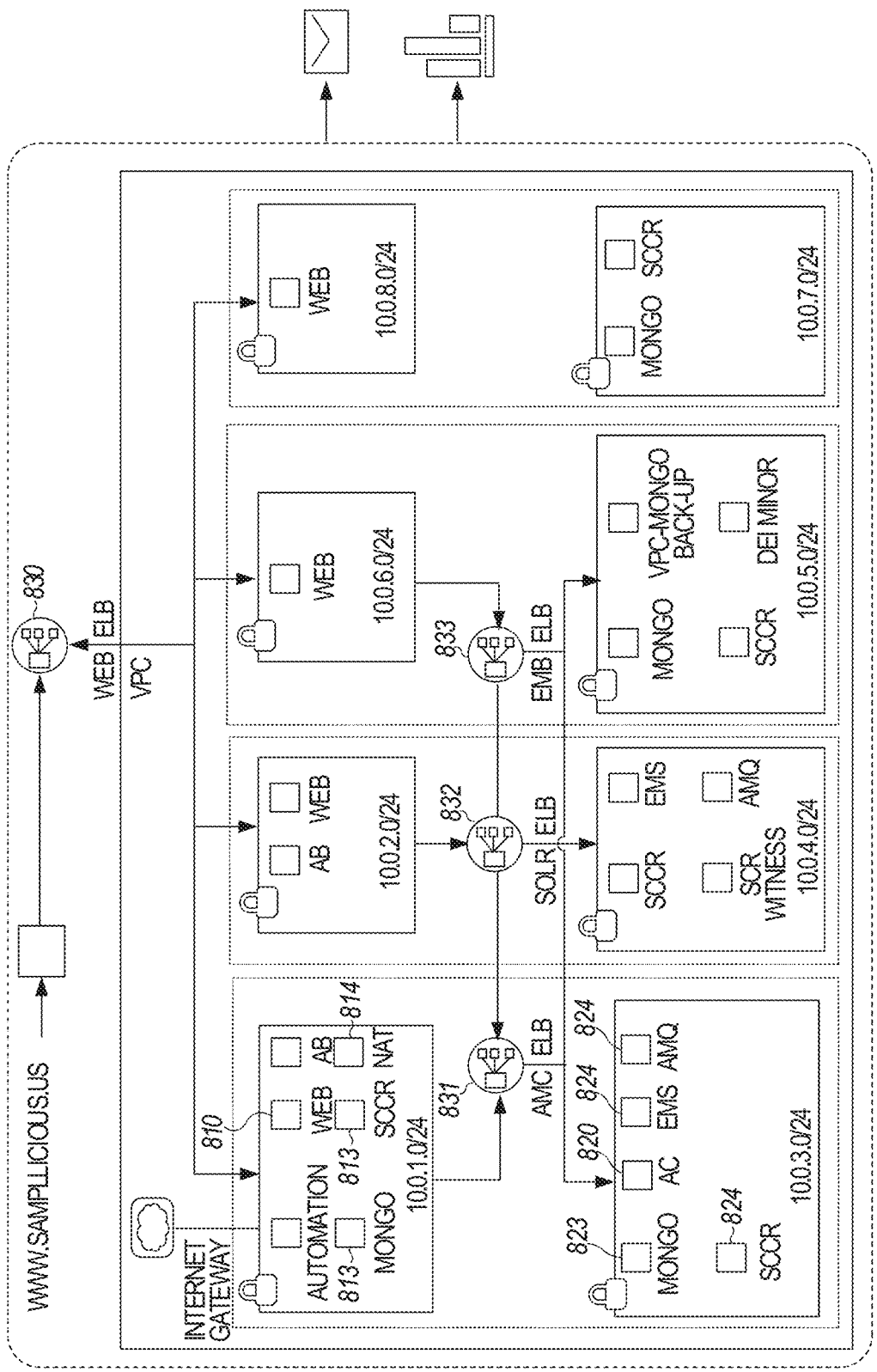
FIG. 7 is a block diagram depicting an exemplary computer architecture of an embodiment of the router platform of the present invention.

FIGS. 6 and 7 depict exemplary embodiments of a router platform 800 capable of hosting a plurality of online surveys. Referring to FIG. 6, the router platform 800 may include a web server 810 and a database server 820. The web server 810 may comprise web page(s) 811 and a server engine 812. The database server 820 may comprise a respondent repository 821 and a survey repository 822. The survey repository 822 can store: the supplier's routed pricing grid data (which can be inputted by the supplier via the web server 810); the buyer's budget data for each online survey, including the initial value of one or more intrinsic value indicators for each online survey associated with the buyer (which can be inputted by the buyer via the web server 810); and data pertaining to one or more intrinsic value indicator properties as each survey respondent takes each online survey on the router platform 800.

The web server 810 can communicate with the database server 820 in order to provide the functionality of the router platform 800 described herein. For example, in operation, the web server 810 may receive HTTP requests from a particular respondent's user device 701 to access a web page(s) 811 containing a list of available surveys stored on the database server 820. The web server 810 will communicate with the respondent repository 821 to access the respondent's device information and will communicate with the survey repository 822 to compile a list of eligible surveys for the respondent. The server engine 812 will then provide the web page(s) 811 containing the listing of eligible surveys to the respondent's user device 701. If the respondent does not qualify for the first online survey, the web server 810 will communicate with the survey repository 822 to access the supplier's routed pricing grid data, the buyer's budget data for each online survey, and the recorded intrinsic value indicator data for each online survey. In order to create a new price-matched group of online surveys for the respondent, the logic in web server 810 will: 1) calculate the intrinsic value indicator for each survey in the survey pool; 2) determine the supplier's bid price for each survey in the survey pool by comparing the intrinsic value indicators for the online survey to the supplier's routed pricing grid; and 3) compare the supplier's bid price for routed completes for the online survey with the buyer's budget for the online survey. Then the web server 810 will provide the web page(s) containing an updated listing of eligible surveys to the respondent's user device 701.

Referring now to FIG. 7, another exemplary embodiment of the router platform 800 is depicted. One or more elastic load balancers 830, 831, 832, 833 are utilized to balance the traffic across the web and database servers 810, 820. The router platform 800 may further comprise additional components and applications, such as: an automation server 812; one or more bastion hosts 813; a network address translation (NAT) application 814; a non-relational database 823 (e.g., MongoDB); and various enterprise search engines 824 (e.g., SOLR, EMS, AMQ). Although the router platform 800 is described as being comprised of these components in this particular embodiment, fewer or more hardware and software components may comprise the router platform 800 and still fall within the scope of the system of the present invention. For example, the router platform of the present invention can be adapted to accomplish any number of the following functions: allow survey creators to create online surveys; store and host online surveys; present online surveys to respondents; route respondents who are terminated from a first online survey to other online surveys; present survey results and other output data related to the online surveys to survey creators and/or survey administrators; allow a survey administrator to manage the database of online surveys; allow a supplier to set one or more routed pricing grids; allow a buyer to set a budget for each online survey; allow each buyer to set an initial value of one or more intrinsic value indicators for each online survey associated with the buyer; create a price-matched group of online surveys; determine a price for surveys completed by routed respondents (i.e., routed completes) for an online survey from a routed pricing grid using intrinsic value indicators for the online survey; compare the price for routed completes for an online survey from a routed pricing grid with a budget for the online survey; measure and record one or more properties as each survey respondent takes each online survey on the router platform; calculate the intrinsic value indicator from the recorded properties; and update the intrinsic value indicator calculations in real time. One skilled in the art will recognize that the number of required hardware and software components may be dependent on the features provided by the router platform 800.

Figure 8:
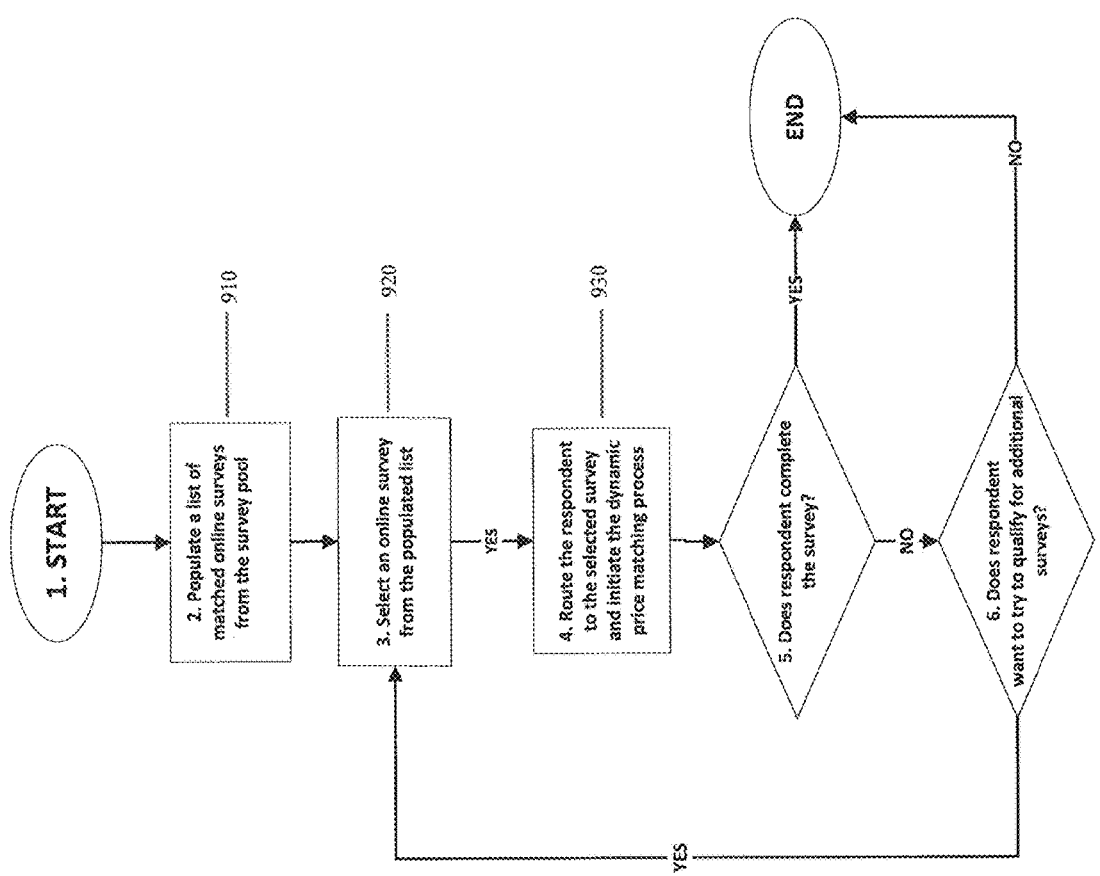
FIG. 8 is a flow diagram depicting an exemplary process of the present invention for dynamically matching a supplier's bid price offered to the intrinsic value of a survey and then routing the supplier's respondent(s) to the survey if the supplier's bid price is less than or equal to the survey budget set by the buyer.

FIG. 8 is a flow diagram depicting an exemplary process of the present invention for dynamically matching a supplier's bid price offered to the intrinsic value of a survey and then routing the supplier's respondent(s) to the survey if the supplier's bid price is less than or equal to the survey budget set by the buyer. In the illustrated process, a respondent from a panel has been terminated from a first online survey on the router platform 800 and is in the process of being routed to an out-of-network survey on the router platform 800. In step 910, the router platform 800 will populate a list of matched online surveys from the survey pool, filtering out unmatched online surveys for which the respondent fails to qualify for due to either the respondent's previously recorded responses to screening questions or due to the supplier's routed pricing being wholly incompatible with the buyer's budget for the particular survey. In step 920, the router platform 800 will select an online survey from the populated list. In step 930, the router platform will route the respondent to the selected survey to conduct the price matching method of the present invention. If the respondent is matched with a particular survey and completes the survey, the respondent's session on the routing platform will be completed. If the respondent is matched to a survey but fails to complete it, the routing platform 800 will inquire whether the respondent wishes to attempt to qualify for another survey. If so, the router platform 800 will again select an online survey from the populated list (step 920) and reinitiate the price matching method described herein.

Figure 9:
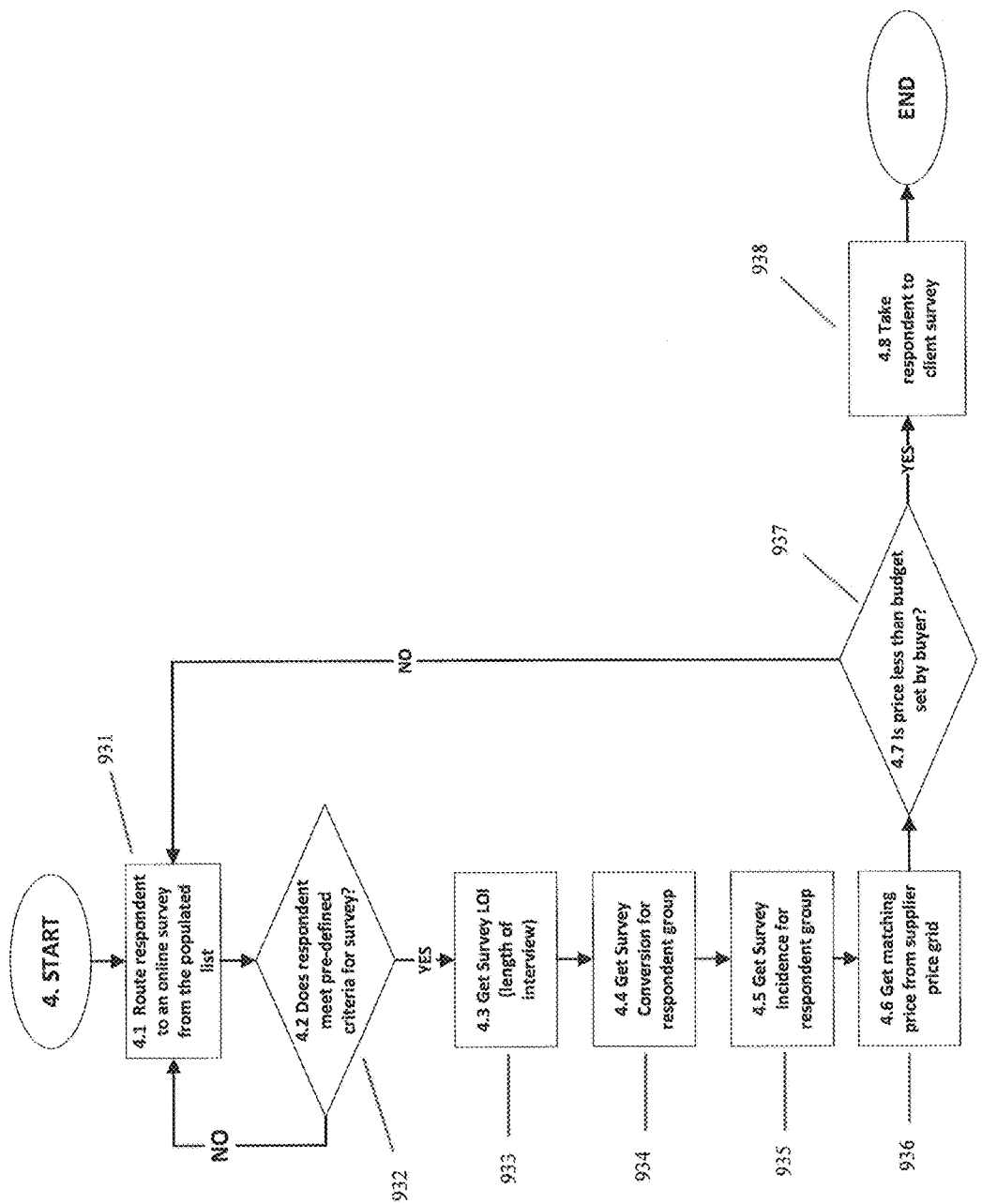
FIG. 9 is a flow diagram depicting an exemplary subroutine for conducting the price matching method of the present invention.

FIG. 9 is a flow diagram depicting an exemplary subroutine for conducting the price matching method of the present invention. In step 931, the router platform 800 will route the respondent to an online survey from the populated list of matched online surveys. The router platform 800 will then present screening questions (demographic and/or targeted questions) to the respondent to determine if he/she qualifies for the survey (step 932). If the respondent qualifies, the routing platform will utilize the survey LOI (step 933), the survey conversion value (step 934), and/or the survey incidence value (step 935) to calculate the supplier's bid price using the supplier's routed pricing grid data (step 936). The router platform will then compare the supplier's bid price to the budget set by the buyer (step 937). If the bid price is less than the buyer's budget, the respondent will be sent to the substantive portion of the survey (step 938). In certain embodiments, the entire survey (i.e., both screening questions and substantive survey questions) will be hosted on the routing platform 800. In other embodiments, only the screening questions will be hosted on the routing platform 800. If the respondent qualifies for the survey, he/she will be directed to a third party website (e.g., a website managed by the survey creator and/or administrator) which is hosting the substantive questions of the survey.

The embodiments shown in the drawings and described above are exemplary of numerous embodiments that may be made within the scope of the appended claims. It is contemplated that numerous other configurations may be used, and the material of each component may be selected from numerous materials other than those specifically disclosed. In short, it is the applicant's intention that the scope of the patent issuing herefrom will be limited only by the scope of the appended claims.

What is claimed is:

1. A system for dynamic price matching comprising:
at least one processor; and
memory including instructions that, when executed by the at least one processor, cause the at least one processor to:
receive a routed pricing grid for completion of a plurality of online surveys, wherein each online survey of the plurality of online surveys includes at least one demographic question and at least one targeted question, wherein pricing for completion of the online surveys is based in part on a value indicator, and wherein properties of the value indicator include:
a conversion percentage, wherein the conversion percentage is the percentage of a number of completed surveys divided by an amount of survey respondents passing each of the at least one demographic question and the at least one targeted question;
an incident percentage, wherein the incident percentage is the percentage of a number of completed surveys divided by an amount of survey respondents passing each of the at least one demographic question; and
a length of interview, wherein the length of interview is an amount of time a particular survey respondent takes to complete a particular survey;
receive a budget and an initial value of the value indicator for each online survey of the plurality of online surveys;
generate a price-matched group of online surveys for a survey respondent who has been terminated from a first online survey, wherein generation of the price-matched group of online surveys comprises causing the at least one processor to:
determine a routed complete price for each online survey using the initial value of the value indicator for the online survey and the routed pricing grid; and
identify online surveys with a respective routed complete price less than the budget for the online survey;
select a survey from the price-matched group of online surveys based on load traffic for a survey repository database from a set of survey repository databases; and
transmit the survey to the survey respondent.

2. The system of claim 1, wherein a higher value of the incident percentage and a higher value of the conversion percentage is negatively correlated to the initial value of the value indicator.

3. The system of claim 2, further comprising instructions to:
receive a measurement for a value indicator property as the survey respondent answers the survey;
calculate a value for the value indicator property based on the measurement; and
recalculate the value for the value indicator property on a periodic basis based on receiving a new measurement.

4. The system of claim 1, wherein the routed pricing grid includes pricing based on a plurality of panels of survey respondents, and wherein each survey respondent is associated with a panel.

5. The system of claim 4, further comprising instructions to:
transmit to the survey respondent a set of demographic questions;
receive a set of answers from the survey respondent in response to the set of demographic questions; and
associate the survey respondent with a first panel based on the set of answers.

6. The system of claim 5, wherein determining the routed complete price for each online survey using the initial value of the value indicator for the online survey and the routed pricing grid includes using the pricing associated with the first panel from the routed pricing grid.

7. The system of claim 1, wherein the routed pricing grid includes pricing based on a geographic region for the survey respondent.

8. A method of dynamic price matching comprising:
receiving a routed pricing grid for completion of a plurality of online surveys, wherein each online survey of the plurality of online surveys includes at least one demographic question and at least one targeted question, wherein pricing for completion of the online surveys is based in part on a value indicator, and wherein properties of the value indicator include:
a conversion percentage, wherein the conversion percentage is the percentage of a number of completed surveys divided by an amount of survey respondents passing each of the at least one demographic question and the at least one targeted question;
an incident percentage, wherein the incident percentage is the percentage of the number of completed surveys divided by an amount of survey respondents passing each of the at least one demographic question; and
a length of interview, wherein the length of interview is an amount of time a particular survey respondent takes to complete a particular survey;
receiving a budget and an initial value of the value indicator for each online survey of the plurality of online surveys;
generating a price-matched group of online surveys for a survey respondent who has been terminated from a first online survey, wherein generation of the price-matched group of online surveys further comprises:
determining a routed complete price for each online survey using the initial value of the value indicator for the online survey and the routed pricing grid; and
identifying online surveys with a respective routed complete price less than the budget for the online survey;
selecting a survey from the price-matched group of online surveys based on load traffic for a survey repository database from a set of survey repository databases; and
transmitting the survey to the survey respondent.

9. The method of claim 8, wherein a higher value of the incident percentage and a higher value of the conversion percentage is negatively correlated to the initial value of the value indicator.

10. The method of claim 9, further comprising:
receiving a measurement for a value indicator property as the survey respondent answers the survey;
calculating a value for the value indicator property based on the measurement; and recalculating the value for the value indicator property on a periodic basis based on receiving a new measurement.

11. The method of claim 8, wherein the routed pricing grid includes pricing based on a plurality of panels of survey respondents; and
wherein each survey respondent is associated with a panel.

12. The method of claim 11, further comprising:
transmitting to the survey respondent a set of demographic questions;
receiving a set of answers from the survey respondent in response to the set of demographic questions; and
associating the survey respondent with a first panel based on the set of answers.

13. The method of claim 12, wherein determining the routed complete price for each online survey using the initial value of the value indicator for the online survey and the routed pricing grid includes using the pricing associated with the first panel from the routed pricing grid.

14. The method of claim 8, wherein the routed pricing grid includes pricing based on a geographic region for the survey respondent.

15. At least one non-transitory computer readable medium including instructions for dynamic price matching, that when executed by at least one processor, cause the at least one processor to:
receive a routed pricing grid for completion of a plurality of online surveys, wherein each online survey of the plurality of online surveys includes at least one demographic question and at least one targeted question, wherein pricing for completion of the online surveys is based in part on a value indicator, and wherein properties of the value indicator include:
a conversion percentage, wherein the conversion percentage is the percentage of a number of completed serve is divided by an amount of survey respondents passing each of the at least one demographic question and the at least one targeted question
an incident percentage, wherein the incident percentage is the percentage of a number of completed surveys divided by an amount of survey respondents passing each of the at least one demographic question; and
a length of interview, wherein the length of interview is an amount of time a particular survey respondent, takes to complete a particular survey;
receive a budget and an initial value of the value indicator for each online survey of the plurality of online surveys;
generate a price-matched group of online surveys for a survey respondent who has been terminated from a first online survey, wherein generation of the price-matched group of online surveys further comprises:
determine a routed complete price for each online survey using the initial value of the value indicator for the online survey and the routed pricing grid; and
identify online surveys with a respective routed complete price less than the budget for the online survey;
select a survey from the price-matched group of online surveys based on load traffic for a survey repository database from a set of survey repository databases; and
transmit the survey to the survey respondent.

16. The at least one non-transitory computer readable medium of claim 15, wherein a higher value of the incident percentage and a higher value of the conversion percentage is negatively correlated to the initial value of the value indicator.

17. The at least one non-transitory computer readable medium of claim 16, further comprising instructions to:
receive a measurement for a value indicator property as the survey respondent answers the survey;
calculate a value for the value indicator property based on the measurement; and
recalculate the value for the value indicator property on a periodic basis based on receiving a new measurement.

18. The at least one non-transitory computer readable medium of claim 15, wherein the routed pricing grid includes pricing based on a plurality of panels of survey respondents, and wherein each survey respondent is associated with a panel.

19. The at least one non-transitory computer readable medium of claim 18, further comprising instructions to:
transmit to the survey respondent a set of demographic questions;
receive a set of answers from the survey respondent in response to the set of demographic questions; and
associate the survey respondent with a first panel based on the set of answers.

20. The at least one non-transitory computer readable medium of claim 19, wherein determining the routed complete price for each online survey using the initial value of the value indicator for the online survey and the routed pricing grid includes using the pricing associated with the first panel from the routed pricing grid.

* * * * *

UNITED STATES PATENT AND TRADEMARK OFFICE
CERTIFICATE OF CORRECTION

PATENT NO. : 11,210,682 B2  
APPLICATION NO. : 16/881861  
DATED : December 28, 2021  
INVENTOR(S) : Comer et al.

Page 1 of 1

It is certified that error appears in the above-identified patent and that said Letters Patent is hereby corrected as shown below:

In the Specification

In Column 4, Line 23, delete "invention," and insert --invention.-- therefor

In Column 4, Line 26, delete "operates," and insert --operates.-- therefor

In the Claims

In Column 13, Line 37, in Claim 15, delete "serve is" and insert --surveys-- therefor In Column 13, Line 39, in Claim 15, after "question", insert --;--

In Column 13, Line 45, in Claim 15, delete "respondent," and insert --respondent-- therefor Signed and Sealed this  
Twelfth Day of April, 2022

Drew Hirshfeld  
*Performing the Functions and Duties of the*  
*Under Secretary of Commerce for Intellectual Property and*  
*Director of the United States Patent and Trademark Office*